United States Patent [19]
Genequand et al.

[11] Patent Number: 4,813,830
[45] Date of Patent: Mar. 21, 1989

[54] SCREW ACTUATOR FOR HIGH-PRECISION TRANSLATOR DEVICES

[75] Inventors: Pierre Genequand, Geneve; Philippe Schwab, Yverdon, both of Switzerland

[73] Assignee: Centre Suisse d'Electronique et de Microtechnique S.A., Switzerland

[21] Appl. No.: 109,825

[22] Filed: Oct. 14, 1987

[30] Foreign Application Priority Data

Oct. 14, 1986 [FR] France ................................. 8614230

[51] Int. Cl.⁴ .............................................. B23Q 5/34
[52] U.S. Cl. .................................. 409/174; 51/165.8;
51/240 R; 108/143; 409/219
[58] Field of Search .............. 409/174, 219; 51/165.8,
51/240 R; 408/69, 70; 269/309; 108/143

[56] References Cited
U.S. PATENT DOCUMENTS
1,213,300 1/1917 Todd ................................. 51/240 R FOREIGN PATENT DOCUMENTS
2527328 12/1976 Fed. Rep. of Germany ..... 51/165.8
85848 5/1985 Japan ................................... 51/165.8

*Primary Examiner*—Gil Weidenfeld
*Assistant Examiner*—Daniel W. Howell
*Attorney, Agent, or Firm*—Parkhurst, Oliff & Berridge

[57] ABSTRACT

In an actuator, a carriage coupled to an item to be displaced with a translatory movement comprises a follower element which defines contact surfaces engaged against the flanks of the thread of a micrometric screw. The contact surfaces co-operate with the thread of the screw only over a small angular portion thereof. The follower element of the carriage is held on the thread of the screw by resilient thrust means acting on the carriage so as to urge it pivotally about an axis (X—X) which is parallel to its direction of translatory movement, being prevented from moving in all the other degrees of freedom. The actuator is especially adapted for use in translator devices in which the level of precision is of the order of a micrometer.

15 Claims, 6 Drawing Sheets

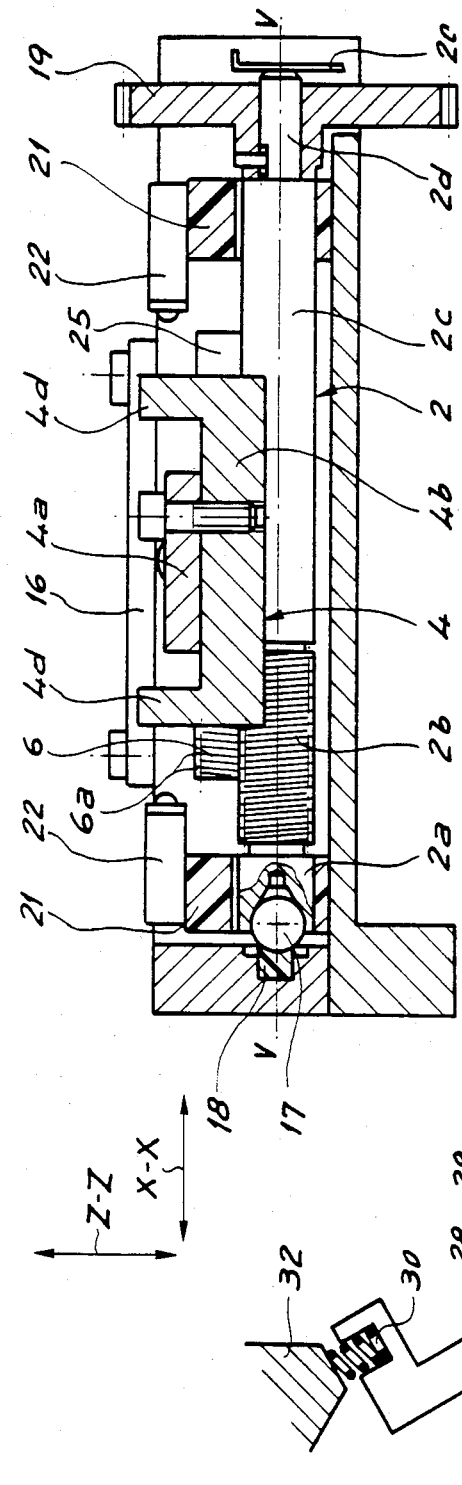
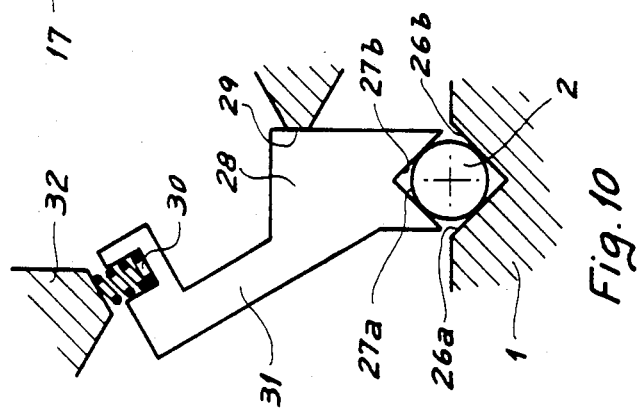
Fig. 5
Fig. 10

SCREW ACTUATOR FOR HIGH-PRECISION TRANSLATOR DEVICES

BACKGROUND OF THE INVENTION

The present invention concerns translator devices and more particularly small-scale translator devices which are used for positioning or displacing with a high degree of precision items such as for example components which are to be machined in within a micrometer, components of an item of optical equipment (mirrors, prisms, etc), optical fibers to be aligned for end-to-end assembly thereof, or plates of semiconductor material, commonly referred to as wafers, in the production of integrated circuits.

More precisely the invention relates to actuators or feed arrangements having a micrometric screw, with which such translator devices are fitted.

In the field of medium-precision mechanical engineering and in particular in the field of machine tools, a degree of precision and reproducibility of the order of 5 to 50 micrometers is generally considered to be adequate so that the problems of weight and size are not considerations of prime importance. Therefore, actuators comprising an assembly made up of a screw and a nut forming a carriage have already long been used in that field for translator devices. The screw can rotate in bearings in a frame structure, while being axially immobilized by abutments. The carriage is guided by parallel sliding guides which compel it to move parallel to the axis of the screw. Added thereto are means for driving the screw in rotation in both directions, formed for example by a motor and a train of gears, although the drive means may also be manual.

That simple design of an actuator is appropriate provided that a certain amount of play in regard to the position of the movable components is tolerated.

If the axial play of the screw and the carriage is to be eliminated, it is possible in addition to provide a support spring around the screw and between the carriage and the frame structure, but that design configuration is far from perfect as the support force of the spring then depends on the position of the carriage. It is possible to improve the level of precision by separately taking up the axial play of the screw and the axial play of the carriage with respect to the screw by means of a second spring which bears against a follower nut also mounted on the screw, which obviously complicates the design.

Moreover, such measures are not sufficient to provide a high-performance actuator which must make it possible to achieve a level of precision of the order of a micrometer and even less and a degree of resolution which is ten times better. In that case, all the plays involved must be completely eliminated. A known way of achieving that consists of using prestressed ball-type bearings and slide members for guiding the carriage and possibly also ball-type transmissions between the carriage and the screw.

Now, the presence of such ball-type components is incompatible with the miniaturization which is desirable for uses such as those referred to hereinbefore.

Moreover, the smaller those components are, the more expensive they are, delicate and subject to rapid wear due to the severely hyperstatic character of their connections and the high levels of stress which result therefrom. Consequently the plays which they are required to eliminate re-appear fairly quickly in the course of use of the arrangement and, the more such plays increase, the greater the reduction in the level of precision of the actuator and the translator device of which they are part.

Moreover, when they are motorized, actuators of that kind are provided with electronic end-of-travel safety devices such as switches or photoelectric cells which make it possible to stop the motor before the carriage touches the frame structure but which run the risk of not always operating. When that actually occurs, the carriage comes to bear against the frame structure and the screw which continues to rotate resiliently loads the frame structure until the frictional torques induced by its axial thrust force are sufficient to stop the motor. As the screw is irreversible, the friction persists after the motor has stopped and in general the motor does not have a sufficient level of torque to re-start in the opposite direction, so that the mechanism remains jammed.

When that failure occurs in screw-type actuators of relatively large size, it is easy to unjam the arrangement by manual means, and it is even possible to try to eliminate the risk of failure by supplementing the electronic safety devices with mechanical safety devices.

In contrast, when dealing with actuators of very small dimensions, a manual unjamming operation is very delicate one and the presence of additional mechanical safety devices does not go hand in hand with miniaturization.

SUMMARY OF THE INVENTION

The present invention seeks to provide a novel screw actuator for a translator device, which does not suffer from the above described disadvantages.

The invention therefore concerns a screw actuator, in particular for a microtranslator device comprising a fixed reference base, a micrometric screw rotatably mounted to said fixed base, motor means for imparting to the screw a rotary movement about its axis and a carriage coupled to the member to be displaced and mounted for translatory movement on the fixed base in a direction parallel to the axis of the screw, the carriage comprising a follower element which is engaged with the thread of the screw and which is provided with at least two contact surfaces respectively applied against the flanks of the thread of the screw.

The invention is characterized in that:

the contact surfaces of the follower element are engaged in an angularly limited portion of the thread of the screw;

the carriage is mounted movably on the base by way of suspension means permitting a limited rocking movement of the carriage about an axis parallel to the axis of the screw; and there are provided resilient thrust means which bear against the base and which co-operate with the suspension means to urge the carriage about its axis of rocking movement so as to hold said contact surfaces in a position of bearing against the flanks of the thread of the screw.

The foregoing characteristics firstly provide for rigorous positioning of the carriage in respect of translatory movement. Indeed, the screw being held axially without any possible play, the thread thereof reflects the reference in respect to position of the base to the flanks of the screw thread. Now, as the contact surfaces of the follower element are resiliently forced always to bear against the sides of the thread, without any possible axial play, the position of the carriage with respect to the axis of the screw is always rigorously fixed, irrespective of the point on its path of movement at which the carriage is to be found. That property which the features of the invention impart to the actuator gives rise to other advantages which are vitually non-existent hysteresis at the location of the connection between the screw and the carriage and excellent reproducibility of the positions of the carriage with respect to the base.

In addition, the fact that the follower element is in contact with the thread of the screw only over a small angular portion and that moreover it is engaged thereat by resilient stressing eliminates any danger of jamming of the carriage on the screw, even when the electronic end-of-travel safety devices do not suitably operate. Indeed, by virtue of the arrangement proposed by the present invention, the follower element does not form a closed nut on the screw and it cannot therefore become jammed thereon.

Finally, as the resilient thrust means act transversely with respect to the direction of feed movement of the carriage, the action thereof is constant over the entire travel movement of the carriage while the wear and play which could result therefrom are taken up without in any way adversely affecting the degree of precision with which the carriage is positioned.

BRIEF DESCRIPTION OF THE DRAWINGS

The invention will be better appreciated from the following description which is given solely by way of example and with reference to the accompanying drawings in which:

FIG. 4 to 9 are views in section respectively taken along the corresponding section lines indicated in Roman numerals in FIG. 3.

FIG. 10 is a diagrammatic view of an alternative embodiment of the actuator.

DETAILED DESCRIPTION OF THE PREFERRED EMBODIMENTS

Figure 1:
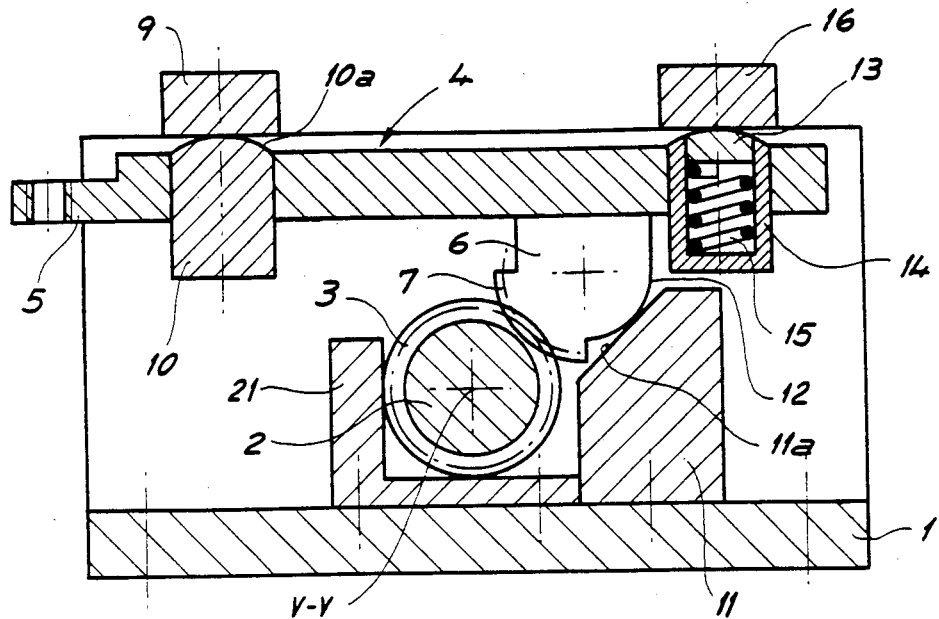
FIG. 1 is a diagrammatic view in cross-section of a screw actuator, showing the basic concept of the present invention.
Figure 2:
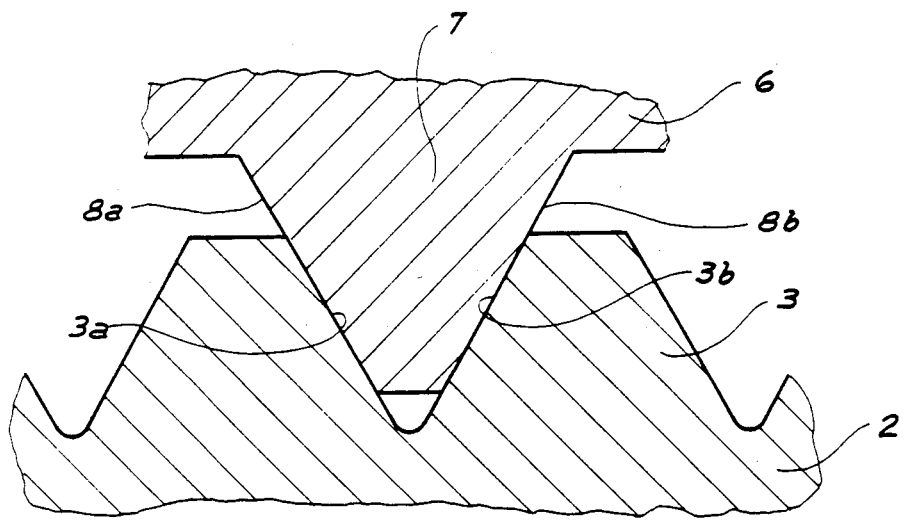
FIG. 2 is a view on a large scale illustrating the profile of the thread of the translator device and the cooperation thereof with the follower element.
Figure 3:
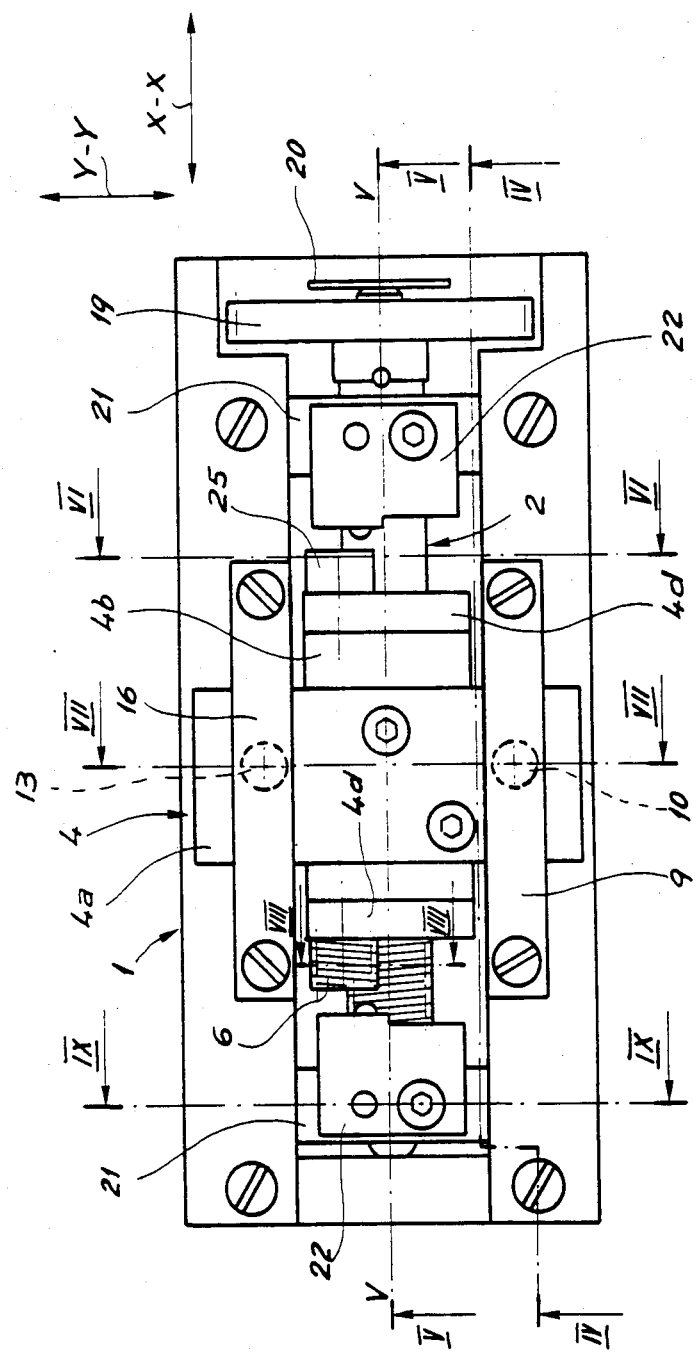
FIG. 3 is a plan view of the preferred embodiment of the screw actuator according to the invention.

Reference will first be made to FIGS. 1 and 2 which diagrammatically illustrate the basic concept of the invention.

Reference numeral 1 denotes a reference base on which a screw 2 is mounted in such a way that it is axially immobilized but movable with a rotational movement, its thread 3 thus forming a reference position along the axis V—V of the screw 2, by means of the flanks 3a and 3b of the spiral turns of the thread 3.

A carriage 4 which is connected to an item (not shown) to be displaced for example by means of a coupling member 5 is suspended in the base 1 in such a way that it can be moved with a translatory movement in a direction which is parallel to the axis V—V of the screw 2.

Carriage 4 comprises a follower element 6 which is assumed here to comprise a rib 7 (see FIG. 2) of trapezoidal section, having lateral contact surfaces 8a and 8b and itself forming a portion of spiral thread which is complementary to the thread of the screw 2.

The carriage 4 is mounted on the base 1 by suspension means which, besides the main translatory movement along the axis V—V of the screw 2, permit a controlled rocking movement about an axis which is parallel to the axis of the screw, being prevented from all other movements. The following description, in describing a specific embodiment of the invention, will show what form the members which provide the above-indicated stability of the carriage may take.

In order to understand the underlying principle of the invention, it is sufficient to note that the suspension means comprise a guide 9 which is fixed on the base and with which a slide member 10 having a curved bearing surface 10a cooperates, and a sliding guide 11 having a flat bearing surface 11a, which is inclined towards the screw 2, and a cylindrical bearing surface 12 provided on the carriage 4 cooperating with the sliding guide 11.

The carriage also comprises a resilient thrust means formed by a movable slide member 13 mounted in a sleeve 14 which in turn is fixed on the carriage and which contains a spring 15 for urging the movable slide member 13 against a guide 16 on the base 1.

It will be appreciated that the carriage 4 is thus resiliently urged about its axis of rocking movement in such a way that the lateral contact surfaces 8a and 8b of the rib 7 are caused to bear firmly against the flanks 3a and 3b of the corresponding angular portion of the thread of the screw 2 by a force component which is approximately parallel to the surface 11a of the sliding guide 11. Hence, the degree of precision in positioning in the direction of translatory movement of the carriage depends solely on the precision with which the thread 3 is cut in the screw 2, the axial position of the latter with respect to the base 1 being perfectly defined and all play as between the follower element and the thread being eliminated by the resilient bearing action provided by the particular suspension means of the carriage 4.

FIG. 1 also shows that lateral positioning of the carriage 4 (that is to say transversely with respect to its direction of movement) may advantageously be achieved by virtue of the presence of the inclined bearing surface 11a and the cylindrical surface 12 on the carriage. This particular arrangement makes it possible to break down the resilient bearing force produced by the spring 15 essentially into a force for holding the rib 7 in the thread 3 of the screw 2 and a force applying the cylindrical surface 12 against the sliding guide 11. The result is that the carriage 4 may be without any other lateral guidance on the base 1, which makes it possible to simplify the slide members 10 and 13 which are formed by simple spherical surface portions which are easy to produce and which give rise to practically no friction in regard to the guide action.

FIGS. 3 to 9 will now be described, illustrating a preferred embodiment of the invention. In FIGS. 3 to 9, the components already described above with reference to FIGS. 1 and 2 are denoted by the same reference numerals.

Figure 4:
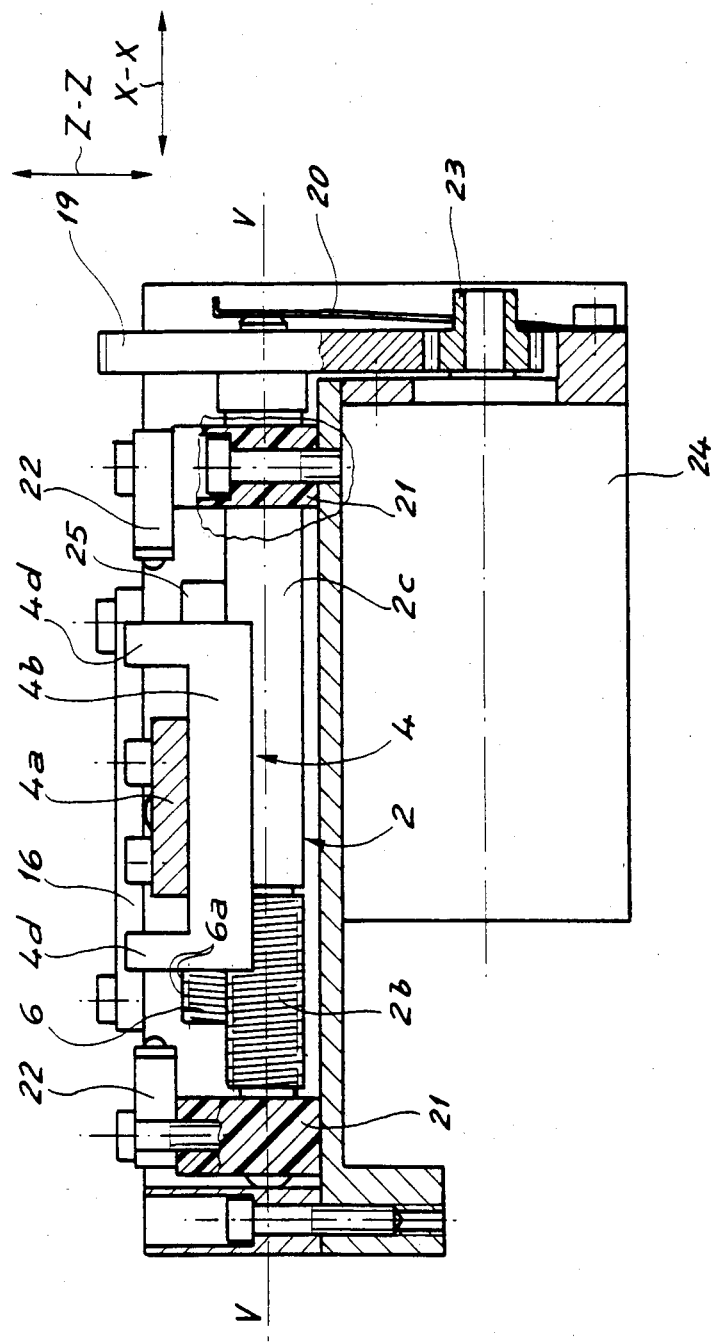

The screw 2 can be seen more clearly from FIGS. 4 and 5. It comprises an axial abutment portion 2a in which there is received a bearing ball 17, for example of sapphire, which cooperates with a fixed thrust bearing 18 mounted in the base 1. The thread 3 is provided over a second portion 2b of the screw, followed by a third portion 2c which has a smooth outside surface. The screw terminates with a bearing portion 2d on which a toothed wheel 19 is fixed, intended to provide for the rotational drive of the screw.

The screw 2 is axially applied against the bearing 18 by means of blade spring 20 which is fixed in the base and which bears against the end face of the portion 2d of the screw 2. By virtue of this arrangement, the screw and consequently the threaded portion 2b thereof are in an axial position which is perfectly defined with respect to the base which constitutes the reference with respect to which the carriage 4 is to be positioned.

Two radial bearing 21 of identical form rotatably suspend the screw 2 on the base 1.

Figure 8:
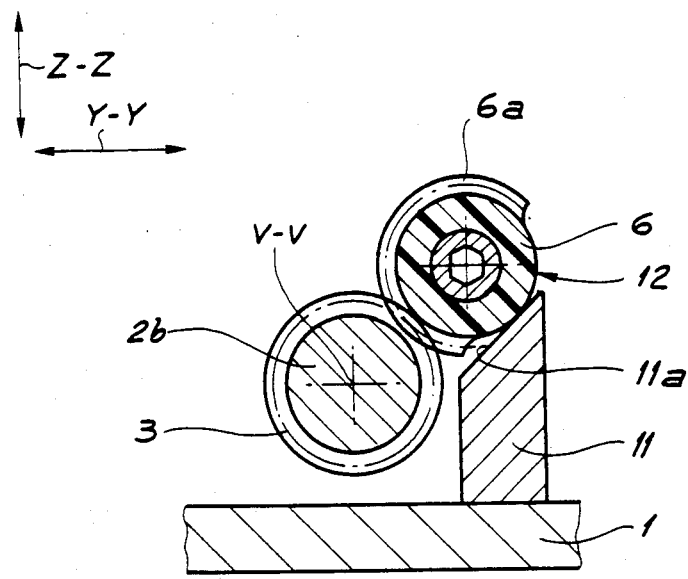
Figure 9:
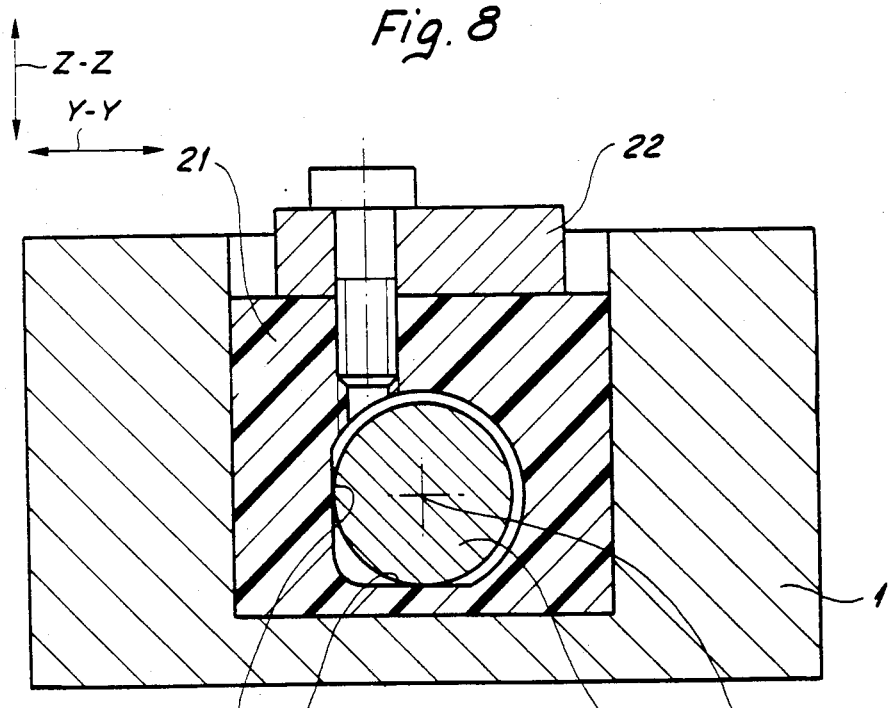

Referring to FIG. 9, it will be seen that each bearing 21 comprises an opening, the wall of which has two flat surfaces 21a and 21b which are disposed at 90° relative to each other and against which the screw 2 bears by way of two generatrices of its two respective portions 2a and 2c. The remainder of the wall of the opening is spaced away from the screw 2. As can be seen by looking at FIGS. 8 and 9, the flats 21a and 21b are disposed in opposite relationship with respect to the direction of application of the force with which follower element 6 is urged into the thread 3 on the screw 2. This therefore provides that the resilient means formed mainly by the spring 15 also serve for radial positioning of the screw 2.

Besides the elements already described above with reference to FIG. 4, the carriage 4 comprises a plate portion 4a (see FIGS. 3 and 4) in which the fixed and movable slide members 10 and 13 are mounted, and a block 4b which is elongated in the form of a stirrup and which extends in the direction of translatory movement of the carriage and to which the plate portion 4a is screwed. The block 4b comprises a recess 4c (see FIG. 7) for the screw 2 and two limb portions 4d which extend upwardly and which are intended to actuate end-of-travel switches 22 which are mounted respectively on the bearings 21. The item to be displaced can be connected to the plate portion 4a, for example, laterally as suggested in FIG. 1.

The toothed wheel 19 (see FIG. 4) meshes with a drive pinion 23 which is fixed on the output shaft of a motor 24 fixed on the base 1. It should be noted that the drive for the screw may be manual, in which respect a knob may be provided for that purpose, for example on the shaft of the pinion 23.

As shown in particular in FIG. 8, the follower element 8 is a shoe member of general cylindrical shape screwed on to the corresponding end face of the block 4b of the carriage 4. The shoe member comprises a series of contiguous ribs 6a (or 7 in FIG. 1 and 2), of spiral shape, the profile of which is illustrated in FIG. 2. The ribs extend angularly over an angle of approximately 270°. The remaining region of the cylindrical surface of the shoe member forms the smooth bearings surface 12 cooperating with the surface 11a of the sliding guide 11. The shoe member is preferably produced by cutting a continuous thread at the surface of a cylindrical sleeve, the thread being of the same characteristics as the thread 3 on the screw 2, and then removing the portion of the thread in the region of the surface 12 to the diameter corresponding to the bottom of the thread.

Figure 6:
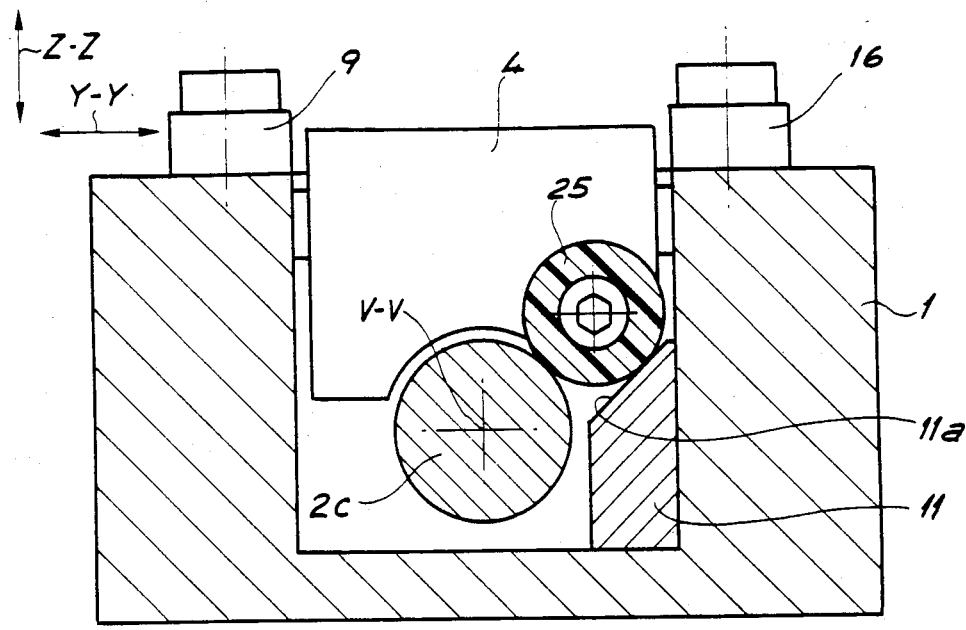
Figure 7:
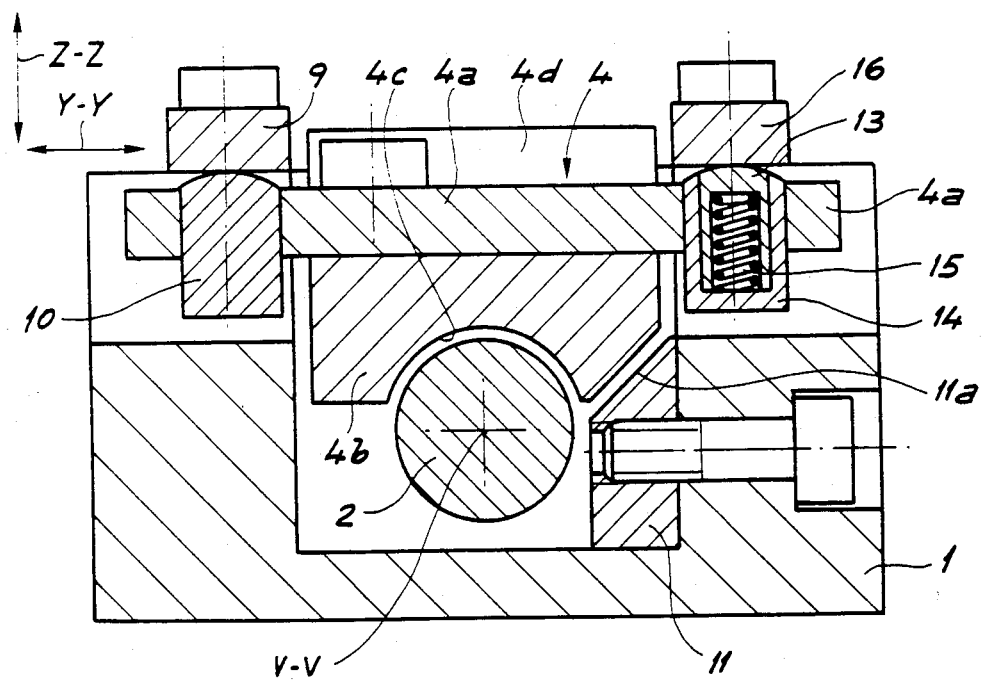

Referring to FIG. 6, it will be seen therefrom that the carriage 4 also carries a smooth shoe member 25 formed by a smooth cylindrical sleeve fixed on to the end face of the block 4b in opposite relationship to the ribbed shoe bearing member forming the follower element 6. The two shoe members are aligned, the diameter of the smooth shoe member being approximately equal to the diameter of the surface 12 of the ribbed shoe member 6.

The smooth shoe member is in contact on the one hand with the smooth portion 2c of the screw 2 and on the other hand with the surface 11a of the sliding guide 11, the contact being secured resiliently by virtue of the force of the spring 15.

The six degrees of freedom with which any body displaceable in space is endowed are generally defined as being formed by three linear movements along three orthogonal axes X—X, Y—Y and Z—Z (as represented in symbolic form by the arrows in the drawings), and three rotational movements respectively about said axes, which are commonly referred to as a rolling movement (axis X—X), a pitching movement (axis Y—Y) and a yawing movement (axis Z—Z).

In the screw actuator, according to the invention, the linear movement of the carriage 4 along the axis X—X is that which corresponds to its translatory movement along the screw 2, which, besides the controlled rocking movement, remains the only possible degree of freedom for the carriage 4. It has been seen that the arrangement according to the invention makes it possible to determine the positioning of the carriage 4 along the axis X—X, with a high degree of precision, as the surfaces 3a, 3b and 8a, 8b always bear against each other by virtue of the resilient thrust means which act in accordance with a rolling movement about that axis. However, according to the invention the same resilient thrust means also make it possible to block the other degrees of freedom of the carriage 4 by virtue of a suitable arrangement of the other bearing surfaces to be found on the carriage, on the one hand, and the base 1 and the screw 2, on the other hand.

Thus, the linear movement along the axis Y—Y is prevented by the contact of the smooth shoe member 25 and the ribbed shoe member 6 against the screw 2 and the sliding guide 11 (FIGS. 6 and 8).

The yawing movement (rotational movement about the axis Z—Z) is blocked by the same members which moreover cooperate with the slide members 10 and 13 and the guides 9 and 16 to block linear movement along the axis Z—Z.

The pitching movement (rotational movement about the axis Y—Y) is blocked by virture of the shoe members 6 and 25 bearing against the corresponding portions 2b and 2c of the screw and also against the surface 11a of the sliding guide 11.

It should be noted moreover that the follower element could comprise only a single rib. However a plurality of ribs as are illustrated in the drawing provides for better transmission of the forward feed force of the screw to the carriage, in which respect any different in shape in respect of the adjacent ribs and any lack of precision on the thread of the screw can be easily compensated if the ribbed shoe member is made of a material having a certain degree of elasticity such as for example the formulation of tetrafluoroethylene and acetal resin marketed by W. S. Shamban & Co. under the mark TURCITE.

It may also be noted that the resilient thrust means formed by the single spring 15 make it possible to use bearings for the screw 2, which are formed by simple flat surfaces such as the flat surfaces 21a and 21b (FIG. 9) against which the screw bears only by way of generatrices. This arrangement promotes effectiveness in regard to the longitudinal positioning of the screw 2, requiring only simple ball-type abutment and a single spring which are disposed respectively at the ends of the screw.

It will be clear that the arrangement according to the invention, by virtue of its extremely simple construction which is without prestressed ball-type guide arrangements for the carriage and a complex transmission between the screw and the carriage, permits advanced miniaturization of the components and a high degree of precision in positioning of the carriage. It has been found that the degree of precision achieved may be better than a micrometer with the present invention. By way of example it may be noted that the actuator constructed as shown in FIGS. 3 to 9 may be 85 mm in length, 36 in width and 20 mm in height (without including the motor 24 and the wheel 19). It should also be noted that assembly of the actuator is quite simple as the screw and the carriage can simply be positioned in the mechanism without any particular precaution or adjustment and maintained thereinafter fitting the guides 9 and 16.

FIG. 10 is a highly diagrammatic view of an alternative embodiment of the actuator, showing that the various bearing surfaces of the carriage and the screw may be arranged in a different fashion from that described above, while remaining within the scope of the invention.

In this case, the base 1 defines bearing surfaces 26a and 26b which are disposed in a V-shaped configuration and facing bearing surfaces 27a and 27b which are also disposed in a V-shaped configuration, provided on a carriage 28.

The carriage 28 also bears against a lateral guide 29 and is resilient urged for rocking movement about an axis parallel to the axis of the screw 2, by resilient means formed by a spring 30 acting on the end of an arm 31 of the carriage 28. The spring 30 bears against a guide 32 on the base.

In order to provide for transmission of the movement of the screw to the carriage, the latter is fitted with a follower element (not shown) which can be formed by a rib projecting form the surface 27a or the surface 27b.

As in the embodiment shown in FIGS. 3 to 9, the support for the carriage 28 on the screw may be provided by means of two axially spaced shoe members having the V-shaped profile of the surfaces 27a and 27b, one of the shoe members being fitted with the follower element.

What is claimed is:

1. A screw actuator for a microtranslator comprising a fixed reference base, a micrometric screw rotatably mounted to said fixed base, drive means for imparting to the screw a rotary movement about its longitudinal axis and a carriage coupled to the member to be displaced and mounted for translatory movement on the fixed base in a direction parallel to the longitudinal axis of the screw, the carriage comprising a follower element which is engageable with a thread of the screw and which is provided with at least two contact surfaces applied against respective flanks of the thread of the screw, wherein the contact surfaces of the follower element are engageable with an angularly limited portion of the thread of the screw;

the carriage is movably mounted on the base by way of suspension means permitting a limited rocking movement of the carriage about an axis parallel to the longitudinal axis of the screw; and there are provided resilient thrust means which bear against the base and which cooperate with the suspension means to urge the carriage about its axis of rocking movement so as to hold said contact surfaces in a position of bearing against said flanks of the thread of the screw.

2. An actuator according to claim 1, wherein said suspension means for the carriage comprises at least three sets of combined bearing surfaces which are respectively provided on the base and the carriage, the surfaces of each of said sets being applied against each other by the action of said resilient thrust means, a first of said sets of combined surfaces providing for rocking movement of said carriage.

3. An actuator according to claim 2, wherein one of the bearing surfaces of the first set of combined surfaces comprises a guide extending in the direction of translatory movement of the carriage and fixed to the base; the second surface of said first set is defined on a slide member having a curved active surface and fixed on the carriage; the second set of combined surfaces comprises first and second pairs of surfaces; the third set comprises third and fourth paris of surfaces, said first and second pairs being separated from each other transversely with respect to the longitudinal axis of the screw; and said second and third sets are spaced from each other in the direction of the translatory movement of the carriage.

4. An actuator according to claim 3, wherein the bearing surfaces on the base which belong to said first and third pairs of surfaces are formed by a flat surface of a single sliding guide mounted on the base and the bearing surfaces on the carriage belonging to said first and third pairs of surfaces are disposed on two shoe members of cylindrical shape, with a common axis, and in contact with said sliding guide by way of a generatrix.

5. An actuator according to claim 4, wherein said follower element is formed by one of said hose members which has a first angular surface portion on which at least one spiral rib is disposed in projecting relationship, lateral flanks of the rib defining said contact surfaces, and a second smooth angular surface portion which is in contact with said sliding guide.

6. An actuator according to claim 4, wherein the flat surface of said sliding guide is contiguous with said screw and inclined with respect thereto in such a way that said resilient thrust means urge said contact surfaces of the follower element against the flanks of the thread of the screw by a force component which is oriented approximately parallel to said flat surface of the sliding guide.

7. An actuator according to claim 5, wherein the flat surface of said sliding guide is contiguous with said screw and inclined with respect thereto in such a way that said resilient thrust means urge said contact surfaces of the follower element against the flanks of the thread of the screw by a force component which is oriented approximately parallel to said flat surface of the sliding guide.

8. An actuator according to claim 5, wherein the fourth pair of surfaces are respectively provided on the other of said shoe members and on a smooth cylindrical bearing surface providing on a smooth portion of the screw, the screw also having a threaded portion.

9. An actuator according to claim 7, wherein the fourth pair of surfaces are respectively provided on one of said shoe members and on a smooth cylindrical bearing surface provided on the screw, the screw also having a threaded portion.

10. An actuator according to claim 8, wherein the fourth pair of surfaces are respectively provided on the other of said shoe member and on a smooth cylindrical bearing surface provided on the screw, the screw also having a threaded portion.

11. An actuator according to claim 7, wherein said screw is radially suspended in bearings each defining two bearing surfaces which are parallel to the axis of the screw and which form a dihedral angle of about 90° and said screw comprises at its two ends cylindrical bearing means which bear against said bearing surfaces by virtue of the force of said resilient thrust means.

12. An actuator according to claim 8, wherein said screw is radially suspended in bearings each defining two bearing surfaces which are parallel to the axis of the screw and which form a dihedral angle of about 90° and said screw comprises at its two ends cylindrical bearing means which bear against said bearing surfaces by virtue of the force of said resilient thrust means.

13. An actuator according to claim 9, wherein said screw is radially suspended in bearings each defining two bearing surfaces which are parallel to the axis of the screw and which form a dihedral angle of about 90° and said screw comprises at its two ends cylindrical bearing means which bear against said bearing surfaces by virtue of the force of said resilient thrust means.

14. An actuator according to claim 11, wherein said screw is radially suspended in bearings each defining two bearing surfaces which are parallel to the axis of the screw and which form a dihedral angle of about 90° and said screw comprises at its two ends cylindrical bearing means which bear against said bearing surfaces by virtue of the force of said resilient thrust means.

15. An actuator according to claim 12, wherein said screw is radially suspended in bearings each defining two bearing surfaces which are parallel to the axis of the screw and which form a dihedral angle of about 90° and said screw comprises at its two ends cylindrical bearing means which bear against said bearing surfaces by virtue of the force of said resilient thrust means.

* * * * *